United States Patent
Ramshaw et al.

(10) Patent No.: US 6,972,113 B1
(45) Date of Patent: Dec. 6, 2005

(54) ROTATING SURFACE OF REVOLUTION REACTOR WITH ENHANCED SURFACE FEATURES

(75) Inventors: Colin Ramshaw, Ponteland (GB); Roshan Jeet Jee Jachuck, Abbey Farm (GB)

(73) Assignee: Protensive Limited, Cambridge (GB)

( * ) Notice: Subject to any disclaimer, the term of this patent is extended or adjusted under 35 U.S.C. 154(b) by 0 days.

(21) Appl. No.: 09/913,904

(22) PCT Filed: Feb. 17, 2000

(86) PCT No.: PCT/GB00/00519

§ 371 (c)(1),
(2), (4) Date: Feb. 4, 2002

(87) PCT Pub. No.: WO00/48728

PCT Pub. Date: Aug. 24, 2000

(30) Foreign Application Priority Data

Feb. 17, 1999 (GB) .................................. 9903474

(51) Int. Cl.[7] .............................................. B10J 19/08
(52) U.S. Cl. ..................... 422/135; 422/138; 422/186; 422/186.3; 422/224
(58) Field of Search ............................... 422/135, 138, 422/186, 186.3, 224; 261/88, 89

(56) References Cited

U.S. PATENT DOCUMENTS

| | | | |
|---|---|---|---|
| 3,831,907 A | 8/1974 | Claes | |
| 4,163,751 A * | 8/1979 | Van der Mey et al. | 558/33 |
| 4,311,570 A * | 1/1982 | Cowen et al. | 204/157.41 |
| 4,343,750 A | 8/1982 | Holiday et al. | |
| 4,356,133 A * | 10/1982 | Cowen et al. | 264/8 |
| 4,460,278 A * | 7/1984 | Matsubara et al. | 366/149 |
| 4,511,414 A | 4/1985 | Matsui et al. | |
| 4,549,998 A * | 10/1985 | Porter et al. | 261/88 |
| 4,627,803 A * | 12/1986 | Umetsu | 425/6 |
| 5,624,999 A | 4/1997 | Lombardi et al. | |
| 6,482,960 B1 * | 11/2002 | Brechtelsbauer et al. | 549/332 |
| 6,515,153 B2 * | 2/2003 | Burns et al. | 554/69 |
| 6,740,763 B1 * | 5/2004 | Nowak et al. | 549/526 |
| 2003/0161767 A1 * | 8/2003 | Ranshaw et al. | 422/186.29 |

FOREIGN PATENT DOCUMENTS

| | | |
|---|---|---|
| DE | 328410 | 5/1930 |
| EP | 0 020 055 | 12/1980 |
| EP | 0 499 362 A1 | 8/1992 |
| EP | 0 810 633 A2 | 12/1997 |
| GB | 1080863 | 8/1967 |
| GB | 1600708 | 10/1981 |
| GB | 2108407 | 5/1983 |
| WO | WO 96/00189 | 1/1996 |

* cited by examiner

*Primary Examiner*—N. Bhat
(74) *Attorney, Agent, or Firm*—Garvey, Smith, Nehrbass & Doody, L.L.C.; Seth M. Nehrbass; Brett A. North

(57) ABSTRACT

A reactor including a rotatable disc (3) having a surface (5) onto which reactant (15) is supplied by way of a feed (4). The disc (3) is rotated at high speed, and the reactant (15) spills over the surface (5) so as to form a film (17). The surface (5) is provided with features to enhance its surface area, such as a metal mesh (60), thereby helping to increase the residence time of the reactant (15) on the surface (5) and to help mixing.

18 Claims, 12 Drawing Sheets

ROTATING SURFACE OF REVOLUTION REACTOR WITH ENHANCED SURFACE FEATURES

The present invention relates to a rotating surface of revolution reactor provided with enhanced surface features.

The invention makes use of rotating surfaces of revolution technology (hereinafter RSORT) (commonly known as spinning disc technology).

The spinning disc concept is an attempt to apply process intensification methods within the fields of heat and mass transfer. The technology operates by the use of high gravity fields created by rotation of a disc surface causing fluid introduced to the dire surface at its axis to flow radially outward under the influence of centrifugal acceleration in the form of thin often wavy films. Such thin films have been shown to significantly improve the heat and mass transfer rates and mixing. The technology was developed for typical heat and mass transfer operations such as heat exchanging, heating, cooling and mixing, blending and the like, for example as disclosed in R J J Jachuck and C Ramshaw, "Process Intensification: Heat transfer characteristics of tailored rotating surfaces", Heat Recovery Systems & CHP, Vol. 14, No 5, p 475–491, 1994.

More recently the technology has been adapted for use as a reacting surface for systems which are heat and mass transfer limited, for example for the reaction of substrates which are highly viscous during at least a stage of the reaction and cause problems in achieving good mixing and product yields.

Boodhoo, Jachuck & Ramshaw disclose in "Process Intensification: Spinning Disc Polymeriser for the Manufacture of Polystyrene" the use of a spinning disc apparatus in which monomer and initiator is reacted by conventional means to provide a pre-polymer which is then passed across the surface of a spinning disc at elevated temperature providing a conversion product in the form of polymerised styrene.

EP 0 499 363 (Tioxide Group Services Limited) discloses another use for spinning disc technology in photo catalytic degradation of organic materials such a hydrocarbons. A solution of salicylic acid and titanium dioxide catalyst was passed across the surface of a rotating disc and irradiated with ultra violet light.

These publications therefore disclose the use of spinning disc technology for heating and mass transfer in inert and reactive systems.

GB 9903474.6 (University of Newcastle), from which the present application claims priority and the disclosure of which is hereby incorporated into the present application by reference, describes the use of RSORT in the conversion of a fluid phase substrate by dynamic heterogeneous contact with an agent. In this application, it is described how it has surprisingly been found that spinning disc technology may be further adapted to apply process intensification methods not only within the fields of heat and mass transfer but also within the field of heterogeneous contacting. Furthermore, it is described how it has surprisingly been found that the quality of the product obtained is of higher quality than that obtained by conventional processing having, for example, a higher purity or, in polymers, a narrower molecular distribution.

In addition to this, spinning disc technology can be used to obtain products not readily obtainable by other technology.

According to a first aspect of the present invention, there is provided a reactor apparatus including a support element adapted to be rotatable about an axis, the support element having a surface and feed means associated therewith for supplying at least one reactant to the surface, characterised in that the surface is provided with at least one layer of a mesh which enhances its effective surface contact area in relation to the reactant and which increases a residence time of the reactant on the surface when the reactor apparatus is in use.

According to a second aspect of the present invention, there is provided a reactor apparatus including a support element adapted to be rotatable about an axis, the support element having a surface and feed means associated therewith for supplying at least one reactant to the surface, characterised in that the surface is provided with pins or wires which enhance its effective surface contact area in relation to the reactant and which increase a residence time of the reactant on the surface when the reactor apparatus is in use.

According to a third aspect of the present invention, there is provided a reactor apparatus including a support element adapted to be rotatable about an axis, the support element having a surface and feed means associated therewith for supplying at least one reactant to the surface, characterised in that the surface is provided with at least one layer of a reticulate foam which enhances its effective surface contact area in relation to the reactant and which increases a residence time of the reactant on the surface when the reactor apparatus is in use.

In some embodiments of the present invention, the surface is also provided with a catalytic material.

The catalytic material may be applied as a smooth layer or may be roughened so as to provide enhanced surface area. Preferably, the catalytic material is a heterogeneous catalyst. Examples of such catalysts include platinum, palladium, nickel or any of these metals supported on or impregnated in a layer of alumina (for hydrogenation of liquids), or chromia (for polyolefin production).

The surface may be treated by ion bombardment or implantation so as to produce changes in surface wettability.

It is to be understood that the term "reactant" is not limited to substances which are intended to undergo chemical reaction on the surface of the support element, but also includes substances which are intended to undergo physical or other processes such as mixing or heating. Similarly, the term "product" is intended to denote the substance or substances which are collected from the first surface of the support element, whether these have undergone chemical or physical processing or both. In addition, although it is envisaged that most reactants and products will be in the liquid phase, the apparatus can be used with any suitable fluid phase reactants and products, including combinations of liquid, solid and gaseous reactants and products. For example, solid phase substances in substantially free-flowing particulate form can have macroscopic fluid flow properties.

Reference herein to a rotating surface is to any continuous or discrete planar or three dimensional surface or assembly which rotates approximately or truly about an axis, and preferably is reference to an approximate or true rotating surface of revolution. An approximate rotating surface of revolution may comprise an asymmetric axis and/or deviation in the surface body and/or circumference creating an axially or radially undulating surface of revolution. A discrete surface may be in the form of a mesh, grid, corrugated surface and the like.

Reference herein to a substantially radially outward flowing film as hereinbefore defined is to any fluid film which may be created by dynamic contact of the fluid phase reactant and the rotating surface as hereinbefore defined, suitably the fluid phase reactant is contacted with the rotating surface at any one or more surface locations and caused to flow outwardly by the action of centrifugal force. A film may be a continuous annulus or may be a non-continuous arc at any radial location. The substrate may provide a plurality of films in dynamic contact with a rotating surface as hereinbefore defined.

For example processes requiring extended contact time may be carried out in continuous manner with use of a recycle of fluid exiting at the periphery of the rotating surface towards the axis of the rotating surface enabling sequential passes of fluid across the surface. In continuous steady state operation an amount of fluid exiting the surface may be drawn off as product and an amount may be returned by recycle for further conversion with an amount of fresh reactant feed.

An RSORT apparatus (commonly known as a spinning disc reactor) generally includes within a conversion chamber a rotating surface or an assembly of a plurality of these which is rotated about an axis to effect transfer of one or more reactants from the axis preferably radially across the rotating surface.

An RSORT apparatus as hereinbefore defined comprising a rotating surface as hereinbefore defined has a number of advantageous constructional features according to the present invention.

A rotating surface of any shape and surface formation as hereinbefore defined may be provided with surface features which serve to promote the desired process. For example, the surface may be micro or macro profiled, micro or macro porous, non-stick (e.g. coated with a fluoropolymer such as PTFE), for example may have a release coating, may be continuous or discontinuous and may comprise elements such as mesh, for example woven mesh, reticulate foam, pellets, cloth, pins or wires, for enhanced surface area, enhanced or reduced friction effect, enhanced or reduced laminar flow, shear mixing of recirculation flow in axial direction and the like.

Advantageously, the surface features may be made out of or coated with a catalytic material such as a heterogeneous catalyst. Examples of such catalysts include alumina impregnated with platinum, palladium or nickel (for hydrogenation of liquids) or chromia (for polyolefin production).

In one preferred embodiment, mixing characteristics of the rotating surface are enhanced by the above features or the like provided on or in the rotating surface. These may be provided in any suitable regular or random arrangement of grids, concentric rings, spider web or like patterns which may be suitable for a given application.

Alternatively or additionally to any other surface feature, radially spaced pins in the form of circles or segments of circles may be provided.

In another preferred embodiment, a porous surface coating is provided, which aids processing of certain reactants. Such a coating may be provided in combination with any other of the aforementioned surface features.

Surface features in the form of grooves may be concentric or may be of any desired radially spaced form. For example, the grooves may form "wavy" or distorted circles for maximised mixing.

Grooves may be parallel sided, or may have one or both sides which diverge to form undercut grooves or which converge to form tapered grooves. Preferably, the grooves are undercut to promote mixing.

Grooves may be angled to project towards or away from the axis of the rotating surface to enhance or reduce undercut or taper.

In a particularly preferred embodiment, the rotating surface is provided with a mesh. The mesh may be made out of woven wires or fibres, or may be in the form of a web of such wires or fibres. The wires or fibres are typically made out of a metal, although plastics materials may be appropriate for certain reactants and process conditions. A single layer of mesh may be provided, or a number of layers may be mounted on top of each other. It is generally important to ensure that there is good thermal conductivity between the surface and the layer or layers of mesh so as to enable effective heat transfer, although where heat transfer is not an important consideration, poorly conductive layers of mesh may be used. In general, however, it is preferred that the fin efficiency of the layer or layers of mesh is at least 10%, and preferably at least 50%.

As with the aforementioned surface area enhancing features, the mesh serves primarily to improve mixing of reactants and also to prolong the residence time of reactants on the rotating surface. For some applications, for example polymerisations, it is desirable for the layer or layers of mesh to have a total thickness of the same order of magnitude as the thickness of the film of reactant on the rotating surface, or at most one order of magnitude either way.

The layer or layers of mesh may be open, in that the mesh is exposed at the top of the rotating surface, or may be provided with a fluid impermeable cover which will generally include an aperture for supplying reactant through the cover to the mesh and the rotating surface. In either case, it is preferred that the mesh is in good thermal contact with the rotating surface.

The mesh may be made out of or coated with a catalytic material, for example a heterogeneous catalyst such as palladium, nickel, platinum or other metals, including alloys, as required for individual processes.

The mesh may be glued, clamped, welded or otherwise attached to the rotating surface.

In a preferred embodiment, the rotating surface includes a trough into which the at least one reactant is supplied by the feed means.

The depth of the trough may be selected in accordance with reaction requirements. For example, for photochemical reactions in which UV light is shone onto the reactant, it is preferred for the trough to be relatively shallow, for example having a depth of the same order of magnitude or within one order of magnitude as the expected thickness of a film of reactant formed across the first surface of the support element when rotating at an appropriate speed.

The axis of rotation of the rotating surface or support member may be substantially vertical, in which case gravity tends to pull reactants downwardly with respect to the surface or support member. This may be advantageous with less viscous reactants. Alternatively, the axis of rotation may be generally horizontal, which can achieve improved mixing of reactants provided that these are appropriately retained on the first surface of the support member.

Any suitable feed means may be provided to feed the at least one reactant onto the rotating surface. For example, the feed means may comprise a feed distributor in the form of a "shower head", a "necklace" of outlets or a simple, preferably adjustable, single point introduction such as a "hose-pipe type" feed means. Preferably, the feed means comprises a feed distributor having a plurality of uniformly spaced outlets for the at least one reactant on to the rotating surface as hereinbefore defined. The feed means may also include means for applying UV, IR, X-ray, RF, microwave or other types of electromagnetic radiation or energy, including magnetic and electric fields, to the reactants as they are fed to the trough, or may include means for applying vibration, such as ultrasonic vibration, or heat.

The feed means may be provided at any suitable position with respect to the rotating surface which allows feed of the reactant. For example, the feed means may be axially aligned with the rotating surface for axial feed. Alternatively, the feed means may be positioned such that the feed is spaced from the axis of the rotating surface. Such a position may lead to more turbulence and an enhanced mixing effect.

In one embodiment, feed means may comprise a single feed to the trough which is preferably situated on or co-axial with the axis of rotation of the rotating surface. In this embodiment, reactant flows form the feed outlet into the trough and is subsequently spread out of the trough on to the rotating surface by centrifugal force. In a preferred embodiment, the rotating element as hereinbefore defined comprises a trough situated on the axis of rotation.

The trough as hereinbefore defined may be of any suitable shape such as continuous or annular. For example it may have a continuous concave surface comprising part of a sphere, such as a hemispherical surface, or it may have an inner surface joined to the rotating surface by at least one connection wall or at least two, in the case where the trough is annular. The inner surface and connection wall may be of any form which allows the function of a trough to be fulfilled. For example the inner surface may be parallel to the rotating surface or concave or convex. The connection wall may comprise a single circular or ovoid wall or a plurality of straight walls. The walls may diverge or converge towards the rotating surface.

Preferably, a single circular wall is provided which converges towards the rotating surface to form an undercut trough. This shape generates a reservoir which enhances a circumferential distribution of the reactant flow. Alternative means for forming an undercut trough are also envisaged. For example, where the trough is generally annular in shape, an outer wall may be provided as above, and an inner wall having any suitable shape may serve to define an inner edge to the trough. The undercut portion of the trough should generally be provided as an outer wall so as to help prevent uncontrolled egress of reactant from the trough to the first surface under the influence of centrifugal force as the support element is rotated.

Advantageously, a matrix may be provided in the trough so as to help reactant present in the trough to rotate with the support element, thereby helping to achieve substantially uniform flow from the trough across the first surface. The matrix may be in the form of a plug of fibrous mesh, such as metal or plastics wool, or may take the form of a plurality of projections which are secured to an inner surface of the trough. Other matrix means will be apparent to the skilled reader. In some embodiments, the matrix is manufactured of a material which is inert with respect to the at least one reactant or the product and which is not significantly affected by temperature and other variable process conditions. Alternatively, the matrix may be made of a material which does interact with the at least one reactant or the product, such as a heterogeneous catalyst (e.g. nickel, palladium or platinum or any suitable metal or alloy or compound thereof). Where the matrix is made out of an electrically conductive material, it may be possible to supply an electric current therethrough and thus to provide heating means for heating the at least one reactant within the trough.

In a further embodiment, there may be provided a plurality of feeds adapted selectively to supply one or more reactants to a plurality of troughs formed in the first surface. For example, where the support element is generally disc-like and has a substantially central axis of rotation, there may be provided a first central trough centred on the axis of rotation and feed means for supplying at least one reactant to the first trough, and at least one further trough, preferably also centred on the axis of rotation and having an annular configuration, the at least one further trough being provided with feed means for supplying a second reactant, which may be the same as or different from the first reactant, to the at least one further trough. It will be apparent to the skilled reader that a plurality of troughs may be provided in a similar manner on support elements with shapes other than generally disc-like.

By providing a plurality of troughs and feeds, a sequence of reactions can be performed across the first surface of the support element. For example, two reactants may be supplied to the first trough in which some mixing and reaction will take place. As the support element rotates, the reactants will spread from the first trough to the first surface of the support element, where further reaction and mixing takes place, and thence into a second annular trough concentric with the first trough. A third reactant may then be supplied to the second trough, and further mixing and reaction will take place as the third reactant and the two initial reactants and any associated product are spread from the second trough onto the first surface of the support element for further mixing and reaction. Because the direction of travel of the reactants and products is outwards from the axis of rotation, a controlled series of reactions can be carried out across the first surface of the support member.

Any suitable collection means may be provided for collection of the product as it leaves the rotating surface at its periphery. For example, there may be provided a receptacle in the form of a bowl or trough at least partially surrounding the rotating element or other fixed part of the apparatus. The collection means may additionally comprise a deflector positioned around the periphery of the rotating surface to deflect product into the collection means. The deflector is preferably positioned at an acute angle to the rotating surface.

The components of the collection means, such as the bowl or trough or deflector, may be coated or otherwise provided with a heterogeneous catalyst appropriate to the reactants being reacted on the support element, or may even consist entirely of a material which acts as a heterogeneous catalyst. Furthermore, the components of the collection means may be heated or cooled to a predetermined temperature so as to enable control over reaction parameters, for example by serving to halt the reaction between reactants as these leave the first surface in the form of product. Feed means for supplying a reactant to the product leaving the first surface may also be provided. For example, there may be provided feed means for feeding a quenching medium to product in the collection means so as to halt chemical or other reactions between reactants when these have left the first surface.

The collection means may further comprise outlet means of any suitable form. For example, there may be a single collection trough running around the periphery of the disc or a collection bowl partially surrounding the rotating element.

Outlet means may also be provided in the collection means and these may take the form of apertures of any size and form situated at any suitable position of the collection means to allow egress of the product. In one preferred embodiment, the outlet means are situated to allow vertical egress of the substrate in use.

Alternatively, the collection means may comprise an outer wall provided at the periphery of the support element so as to prevent product from being thrown from the first surface, and at least one pitot tube which extends into the product which is restrained at the periphery of the support element by the outer wall. The outer wall may converge generally towards the axis of rotation of the support member so as better to retain product while the support element is undergoing rotation, although other wall configurations, such as generally parallel to or divergent from the axis of rotation may also be useful.

Embodiments of the present invention may include multiple support elements, which may share a common axis of rotation and which may be mounted on a single rotatable shaft, or which may be provided with individual rotatable shafts. The collection means associated with any given support element may be connected to the feed means associated with any other given support element so as to link a number of support elements in series or parallel. In this way, a reaction may be conducted across a number of support elements in series or parallel. The collection means of a first support member may be directly connected to the feed means of a second support member, or may be connected by way of a processing unit such as a pump, extruder, heater or heat exchanger or any other appropriate device. This is especially useful when dealing with viscous products, such as those which are obtained in polymerisation reactions, since the viscous product of a first support element may be processed so as to acquire more favourable physical characteristics before being used as the reactant feed for a second support element.

For example, where the collection means comprises an outer wall on the first surface of the support element as described above, a number of support elements may be coaxially mounted on a single rotatable shaft so as to form a stack of support elements. A reactant feed is led to the trough of a first support element, and a collector in the form of a pitot tube has its tip located near the first surface of the first support element in the vicinity of the wall so as to take up product from this region. An end of the pilot tube remote from the tip is led to the trough of a second support element so as to allow the product of the first support element to serve as the reactant for the second support element, thereby allowing a number of reactions to take place in series. Alternatively, a number of parallel feeds may supply the same at least one reactant simultaneously to the troughs of a number of support elements and a number of parallel pitot tube collectors may gather product from a peripheral region of each support element, thereby allowing a reaction to take place across a number of support elements in parallel.

It is also envisaged that product collected from the periphery of a support element may be recycled as feed for that support element. This is useful for processes requiring an extended contact time for the reactants. The product may be fully or only partially recycled, depending on requirements.

The process of the invention as hereinbefore defined may operated in a single or plural stages. A plural stage process may comprise a first pre-process stage with further post-process or upgrading stages, and may be carried out batch-wise with use of a single rotating surface as hereinbefore defined or may be carried out in continuous manner with multiple rotating surfaces in series.

Second or more reactants may be added to the feed reactant as it passes from one rotating assembly to the next or be added directly to the rotating assembly anywhere between the axis of rotation or the exit from the assembly. In certain cases a multi-step process may be achieved by reactant addition or additions between the axis of rotation and the exit of a single rotating assembly to achieve more than one process step in a single pass. It is also possible to have different regions of the rotating surface at different temperatures and conditions and have different surface geometries as appropriate to the process needs.

It will be apparent that the process of the invention may be controlled both by selection of a specific rotating surface for the support element and by selecting process variables such as temperature, speed of rotation, rate of reactant feed, conversion time and the like. Accordingly the process of the invention provides enhanced flexibility in process control including both conventional control by means of operating conditions, and additionally control by means of rotating surface type.

The apparatus may further comprise any suitable control system. Such a control system may regulate the temperature or contact time of reactants by means of speed of rotation, rate of substrate feed and other process parameters to obtain an optimum result.

The apparatus as hereinbefore defined may comprise means for optimising process conditions. For example, means for imparting an additional movement to the rotating surface, and thus to the reactant, may be provided. Such movement could be in any desired plane or plurality of planes and preferably comprises vibration. Any suitable vibration means may be provided, such as flexible mounting of the surface or off centre mounting, both inducing passive vibration or active vibration means, such as a mechanical element in contact with the rotating element and vibrating in a direction parallel to the rotating element axis. Preferably a passive vibration means is provided in the form of off centre mounting of the rotating element on its axis of rotation. Vibration may alternatively be provided by an ultrasonic emitter in contact with the rotating element for vibration in any desired plane or plurality of planes.

The rotating surface may have any shape and surface formation to optimise process conditions. For example the rotating surface may be generally planar or curved, frilled, corrugated or bent. The rotating surface may form a cone or be of generally frustoconical shape.

In one preferred embodiment the rotating surface is generally planar and preferably generally circular. The periphery of the rotating surface may form an oval, rectangle or other shape.

In another preferred embodiment the rotating surface is provided as the inner surface of a cone. The apparatus may comprise at least one cone and at least one other rotating surface or at least one pair of facing cones positioned so as to allow a two stage process with one or more reactants fed to each cone. Preferably product exits a smaller cone (or other surface of rotation) in a spray on to the surface of a larger cone (or other surface of rotation) by which it is at least partially surrounded and for the surface of which a further reactant is fed by feed means as hereinbefore defined, to allow mix of the product and reactant on the larger rotating surface. Preferably, means are provided such that the two cones counter rotate. Such an arrangement enhances mixing and intimate contact of the reactants and reduces the required physical contact time. Alternatively, means are provided such that the cones co-rotate or one is stationary.

In another embodiment, there may be provided two generally planar support elements mounted coaxially and generally parallel to each other on an axis of rotation. The facing surfaces of the support elements may be provided with at least one generally circular wall defined about the axis of rotation, and preferably a plurality of concentric walls, the walls being divergent with respect to the axis of rotation of their respective support element. The walls on one support element are positioned out of phase with the walls on the other support element so that the walls fit between each other when the support elements are brought close together. Reactant may be supplied to a region within the innermost wall on one of the support elements. Upon rotation of the support elements, the reactant will tend to move along an interior surface of the divergent wall towards a region within the next wall on the opposed support element, and thence onto an interior surface of the said next wall back towards the first support element. The reactant may continue to move back and forth between the support members so as to progress in a zig-zag manner in a generally radial direction away from the axis of rotation along the interior surfaces of the intermeshed walls towards an outer collection point as described above. In this way, a compact reactor with a high first surface area is achieved, the first surface consisting of the interior surfaces of all the concentric walls. The support elements may rotate together in a given direction, or may rotate at different speeds in the same direction, or may rotate at the same speed or at different speeds in opposed directions.

Energy transfer means may be provided for the rotating surface or reactant or product as hereinbefore described. For example heating means may be provided to heat the reactant, for example, as part of the feed means. Additionally, or alternatively heating means may be provided to heat the rotating element in the form of radiant or other heaters positioned on the face of the rotating element which does not comprise the rotating surface for conversion. Preferably, radially spaced, generally circular radiant heaters are provided.

Any preferred cooling or quenching means may be provided in a suitable position to cool the reacted substrate. For example cooling coils or a heat sink may provide cooling by heat exchange, or a reservoir of quench may provide cooling or reaction termination by intimate mixing in the collection means.

In some embodiments, one of the reactants may be a liquid phase component and another may be a gaseous phase component. In these embodiment, the rotating support member is advantageously contained within a vessel so as to allow the concentration of the gaseous phase component in the vicinity of the surface to be controlled. The liquid component may be fed to the surface of the disc as described above, and the gaseous component supplied to the vessel. A rotary impeller or fan or similar device may be mounted close to the rotating surface and driven so as to suck the gaseous phase component from a region surrounding the periphery of the rotating surface towards the centre of the rotating surface while the liquid phase component travels from the centre of the surface towards its periphery due to the rotation of the rotating surface. Where, for example, the support element is a disc, the impeller or fan may take the form of a generally disc shaped structure mounted coaxially with the support element and close thereto. A surface of the impeller or fan facing the rotating surface of the support element may be provided with blades or vanes such that rotation of the impeller or fan serves to suck the gaseous phase component from a periphery of the surface and the impeller or fan towards the centre of the surface. By providing a counter-current flow of the gaseous and liquid phase components, heat or mass transfer between the components is much improved, since the concentration of unreacted liquid phase reactant is lowest at the periphery of the disc, and therefore benefits from a high concentration of the gaseous phase component so as to ensure full reaction.

For a better understanding of the present invention and to show how it may be carried into effect, reference shall now be made by way of example to the accompanying drawings, in which:

EXAMPLE 1

Polymerisation of Ethylene Using a Catalyst Coated Disc

Phillips catalyst was coated onto the surface of a spinning disc apparatus using methods as described hereinbefore. The coated disc was mounted in a spinning disc apparatus.

Figure 1:
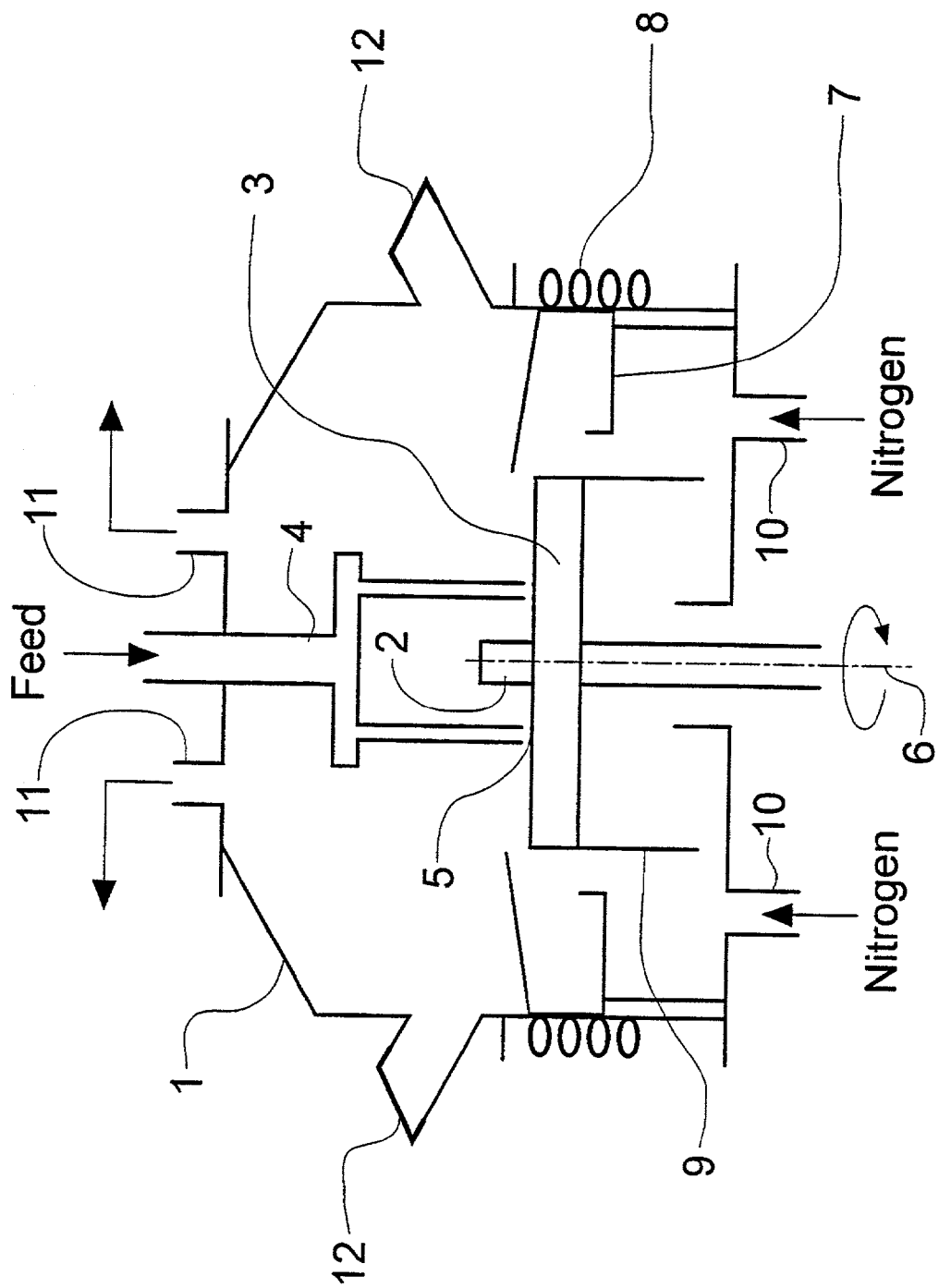
FIG. 1 shows a spinning disc apparatus in schematic form.

The spinning disc apparatus used is shown in diagrammatic form in FIG. 1. The main components of interest being:
i) Top Disc—A smooth brass disc of thickness 17 mm and diameter 500 mm capable of rotating around a vertical axis.

ii) Liquid Distributor—A circular copper pipe of diameter 100 mm, positioned concentrically over the disc, sprayed fluid vertically onto the disc surface from 50 uniformly spaced holes in the underside. Flowrate was controlled manually by a valve and monitored using a metric 18 size, stainless steel float rotameter. A typical fluid flow rate was 31.3 cc/s.

iii) Motor—A variable speed d.c. motor capable of rotating at 3000 rpm was used. The rotational speed was varied using a digital controller calibrated for disc speeds between 0 and 1000 rpm. A typical rotational speed was 50 rpm.

iv) Radiant Heaters—3 radiant heaters (each consisting of two elements) spaced equally below the disc provided heat to the disc. The temperature was varied using a temperature controller for each heater. Each heater temperature could be controlled up to 400° C. Triac regulators were used to control the speed of the controller response. (These remained on setting 10 throughout the tests).

v) Thermocouples and Datascanner—16 K-type thermocouples embedded in the top disc gave an indication of the surface temperature profile along the disc radius. Odd numbered thermocouples 1 to 15 inclusive were embedded from underneath the disc to a distance 3 mm from the upper disc surface. Even numbered thermocouples, 2 to 16 inclusive were embedded from underneath the disc to a distance 10 mm from the upper disc surface. Each pair of thermocouple, i.e. 1 & 2 and 3 & 4 and 5 & 6 etc., were embedded adjacently at radial distances of 85 mm, 95 mm, 110 mm, 128 mm, 150 mm, 175 mm, 205 mm and 245 mm respectively (see FIG. 3). The thermocouples were connected to the datascanner which transmitted and logged the data to the PC at set intervals using the DALITE Configuration and Monitoring Software Package.

vi) Manual Thermocouple—A hand-held K-type thermocouple was used to measure the bulk fluid temperature on top of the disc.

Figure 4:
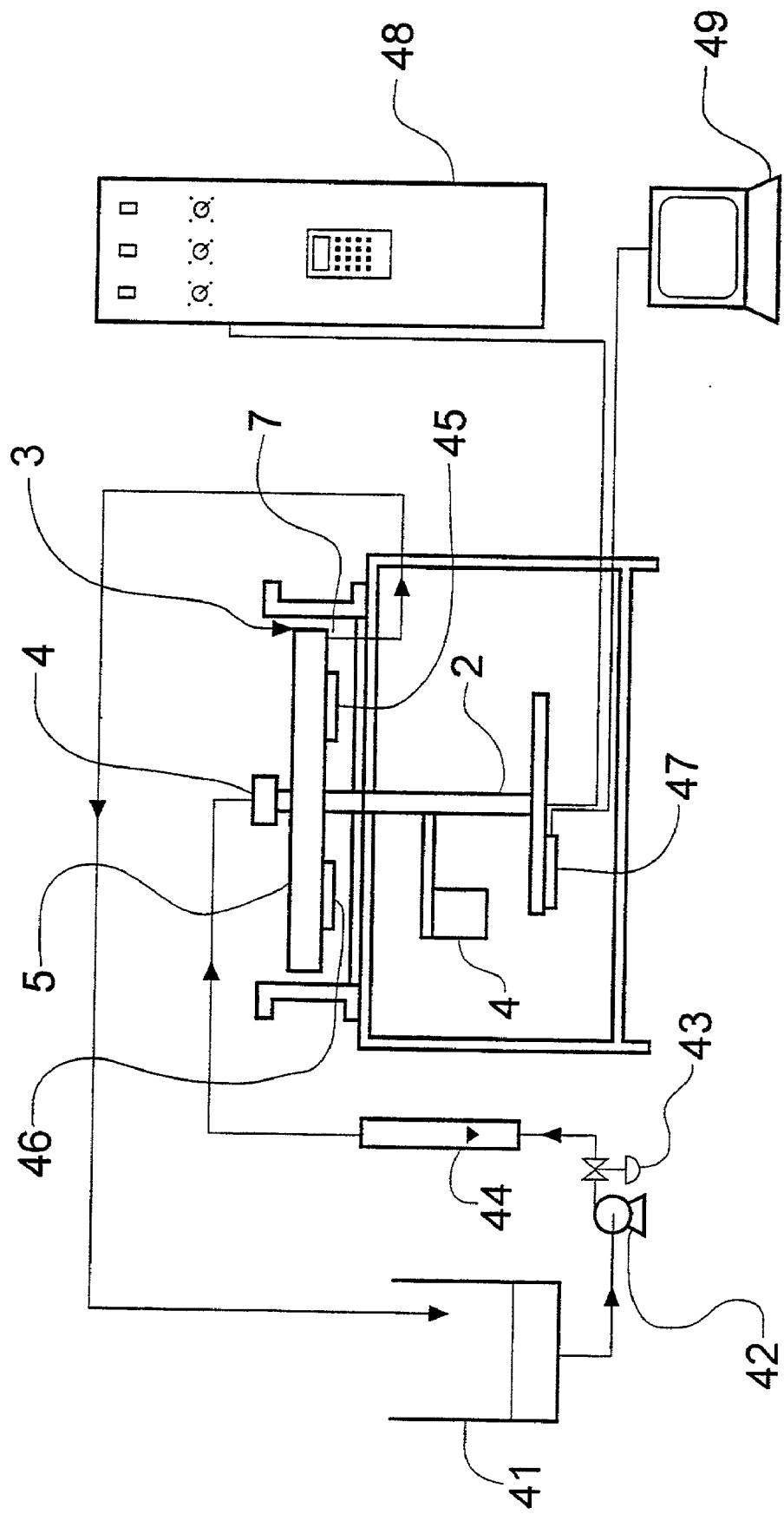
FIG. 4 shows a spinning disc apparatus in schematic form with a reactant recycle arrangement.

The rig was used in two arrangements. In one arrangement, feed was constantly added and the heated product was sent to the collection trough. In an alternative arrangement the rig was assembled with a recycle. The fluid flowpath in the recycle arrangement is shown in FIG. 4.

The spinning disc apparatus of FIG. 1 was started up and temperature and rotational speed adjusted. When steady stage was achieved gaseous ethylene was fed to the revolving catalyst coated disc surface at it axis. Product was withdrawn in the collection trough at the periphery of the disc. Analysis revealed the product was high grade polyethylene.

EXAMPLE 2

Precipitation of Barium Sulphate Crystals Using a Disc Providing a Nucleation/Growth Rotating Surface A nucleation surface was provided on the surface of a disc adapted to provide a rotating surface using methods as described hereinbefore. The disc was mounted in a spinning disc apparatus.

The spinning disc apparatus used is as described in Example 1. Barium chloride and sodium sulphate solutions were reacted on the surface of the spinning disc. Barium sulphate crystals precipitated out from the solution and the effect of rotational speed on the crystal size and size distribution was studied.

EXAMPLE 3

Precipitation of Calcium Carbonate Crystals Using a Disc Providing a Nucleation/Growth Rotating Surface A nucleation surface was provided on the surface of a disc adapted to provide a rotating surface using methods as described hereinbefore. The disc was mounted in a spinning disc apparatus.

The spinning disc apparatus used is as described in Example 1. Calcium hydroxide and carbon dioxide (gas/liquid) were reacted on the surface of the disc and the effect of rotational speed on the crystal size and size distribution was studied.

FIG. 1 illustrates a spinning disc apparatus for use with the present invention. The apparatus is enclosed in vessel (1) having at its axis a drive shaft (2) supporting a spinning disc (3). Feed means (4) provides reactant to an undercut annular trough (13) provided in the surface (5) of the disc (3) about its axis (6). Rotation of the disc (3) causes reactant to flow radially outwards, whereby it contacts the surface (5) of the spinning disc (3). Fluid is collected at the peripheral edges of the disc (3) by means of collection trough (7) and may be rapidly quenched by means of cooling coils (8). A skirt (9) prevents meniscal draw back of fluid contaminating the drive shaft mechanism. Inlet means (10) enable controlled environment conditions to the provided, for example a nitrogen atmosphere. Outlet vent means (11) enable the venting of atmospheric gases or gases evolved during operation. Observation means are provided by means of windows (12) to observe the progress of the conversion.

The apparatus of FIG. 1 may be started up and operated as described in Example 1 above. In the case that the process is an exothermic conversion, cooling coils (8) may be used to quench the collected product in the trough (7). The spinning disc (3) is provided with heating coils (not shown) which may be used to initiate or maintain conversion. The disc (3) or the reactor vessel (1) may be provided with a source of radiation, means for applying an electric or magnetic field and the like as described, at or above the disc surface (5) or at the wall of the reactor vessel (1).

Figure 2:
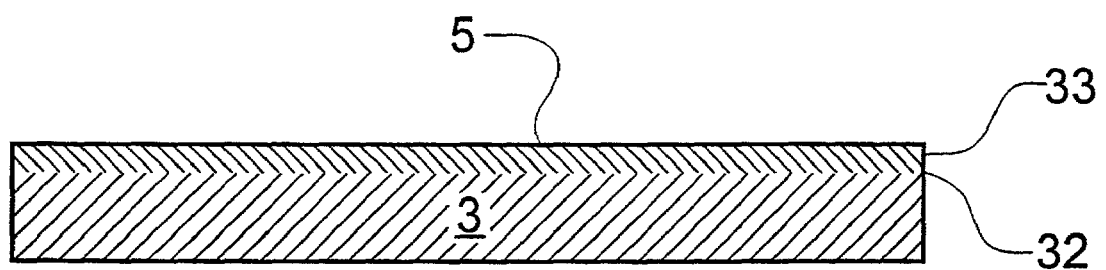
FIG. 2 shows a section through a first spinning disc.

In FIG. 2 is shown a typical spinning disc (3) in the form of a rotating surface (5). The surface (5) has been subjected to ion bombardment and implantation so as to create a layer (33) with different surface wettability properties to the material of the body of the disc (3).

Figure 3:
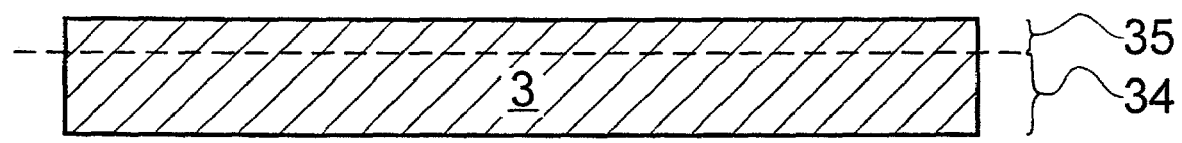
FIG. 3 shows a section through a second spinning disc.

In FIG. 3 is shown an alternative spinning disc (3) in which the agent which it is desired to immobilise is also known as a conventional support material, for example a refractory oxide. In this case the spinning disc (3) is constructed entirely of refractory oxide, the body of which (34) provides a support function and the surface of which (35) provides a catalytic function.

FIG. 4 shows an alternative reactor including a spinning disc (3) mounted on a drive shaft (2) connected to a motor (40). Feed means (4) supplies reactant to a central portion of the surface (5) of the disc (3), and collector means (7) collects product thrown from the surface (5). The product is taken to a feed tank (41) from where it is pumped by pump (42), through a flowrate control valve (43) and rotameter (44) before being recycled to the feed (4). Electric heaters (45) and thermocouples (46) are provided underneath the disc (3) and connected to a datascanner (47) and a control unit (48) which serves to regulate the temperature of the disc (3) and its rotational speed. A datalogger (49) is provided to record process details such as temperatures and rotational speeds.

Figure 5:
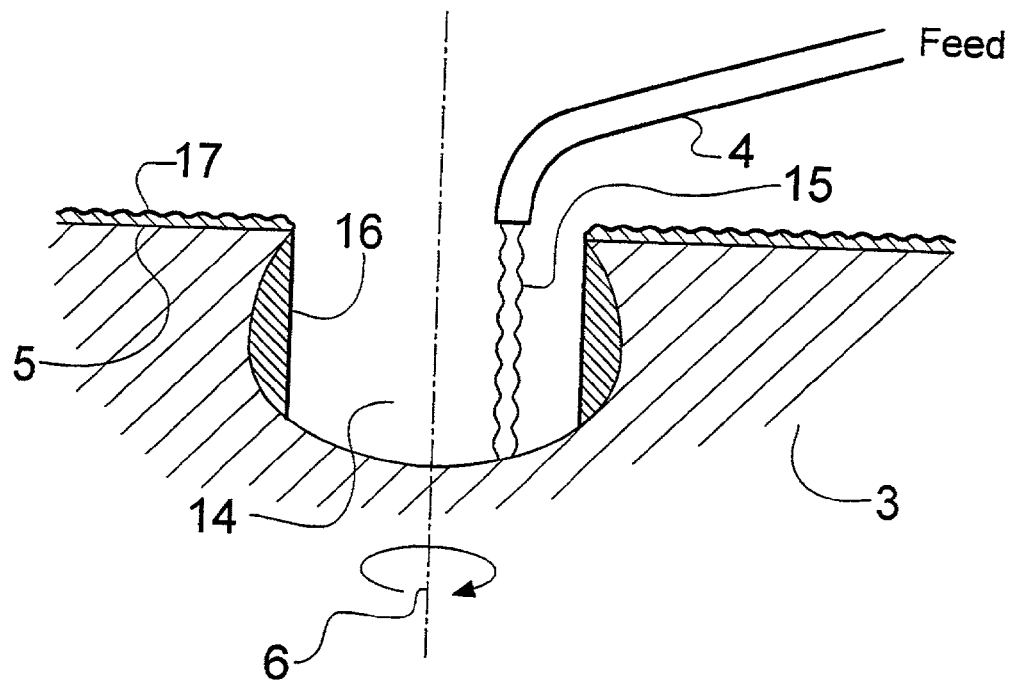
FIG. 5 shows a detail of a spinning disc having a central trough.

In FIG. 5 there is shown an axially located central trough (14) which is continuous and forms a well situated on the axis of rotation (6) of the rotating surface (5) of a disc (3). Rotation causes reactant (15) supplied by the feed means (4) to flow to the wall and form an annular film (16) within the trough (14). The annular film (16) then spills over onto the surface (5) of the disc (3) to form a film (17) on the surface (5).

Figure 6:
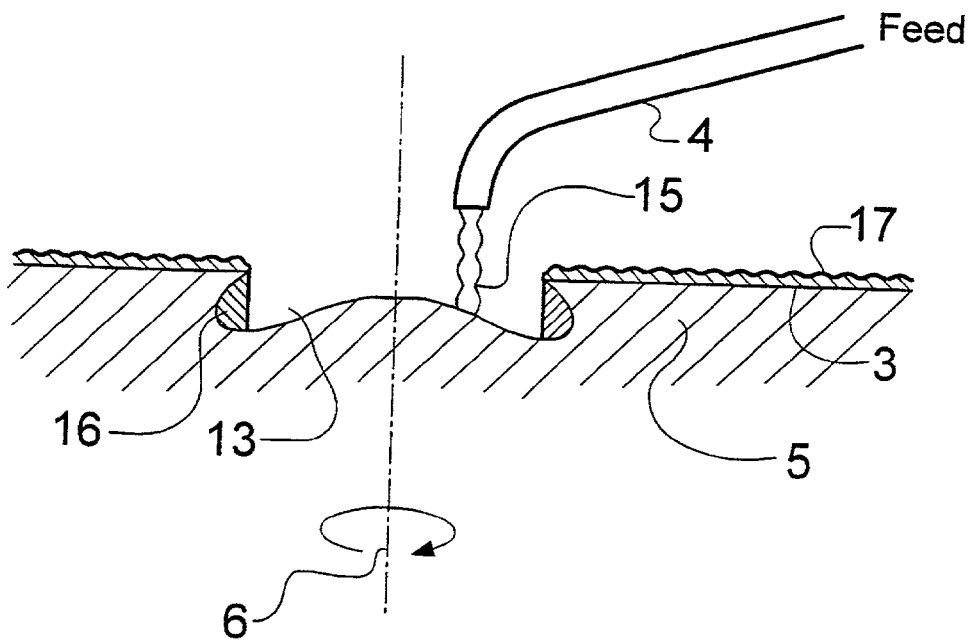
FIG. 6 shows a detail of a spinning disc having an annular trough.

In FIG. 6 the trough (13) is annular and forms a channel co-axial about the axis of rotation (6) of the disc (3). Rotation assisted by the trough profile causes reactant (15) to flow into the trough (13) and to the wall thereof and form an annular film (16) within the trough (13) before spilling over onto the surface (5) of the disc (3) in the form of a film (17).

Figure 7:
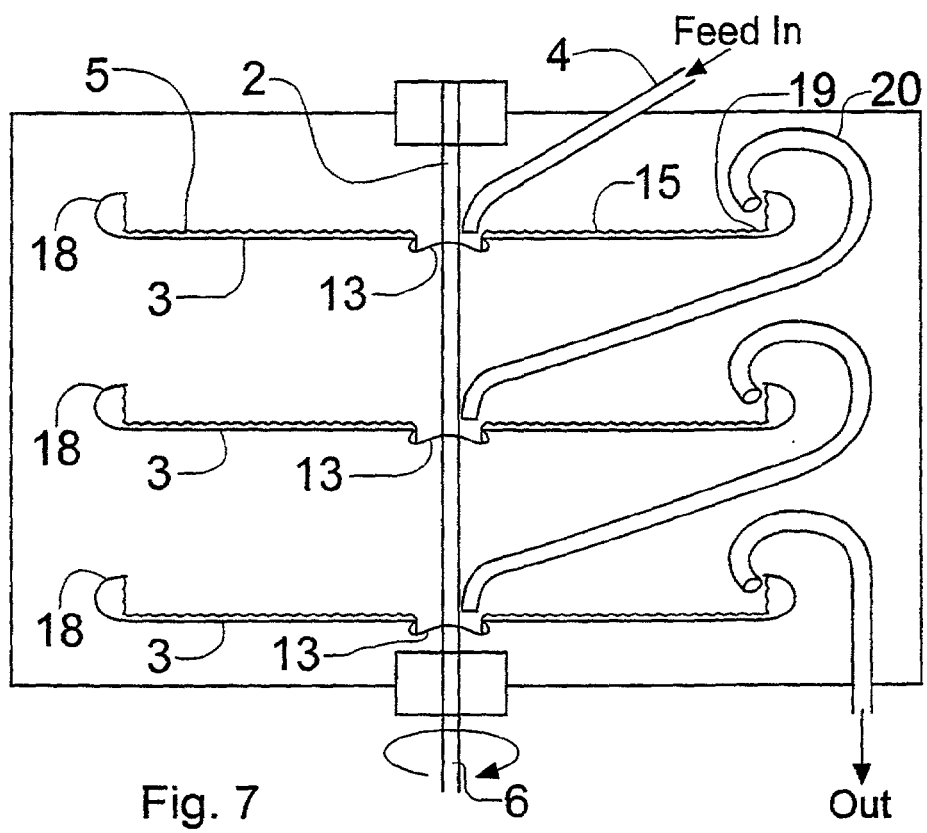
FIG. 7 shows a number of spinning discs in schematic form and operatively arranged in series.

FIG. 7 shows three discs (3) coaxially mounted on a drive shaft (2) which defines an axis of rotation (6). Each disc (3) has a central trough (13) into which reactant (15) may be fed, and a peripheral wall (18). Reactant (15) is supplied to the trough (13) of the topmost disc (3) by way of feed means (4), and then spreads out over the surface (5) of the disc (3). Product (19) is collected from the vicinity of the peripheral wall (18) by way of a pitot tube collector (20), which then feeds product (19) to the trough (13) of the next disc (3) down on the drive shaft (2). In this way, a process can be performed across a number of discs (3) in series.

Figure 8:
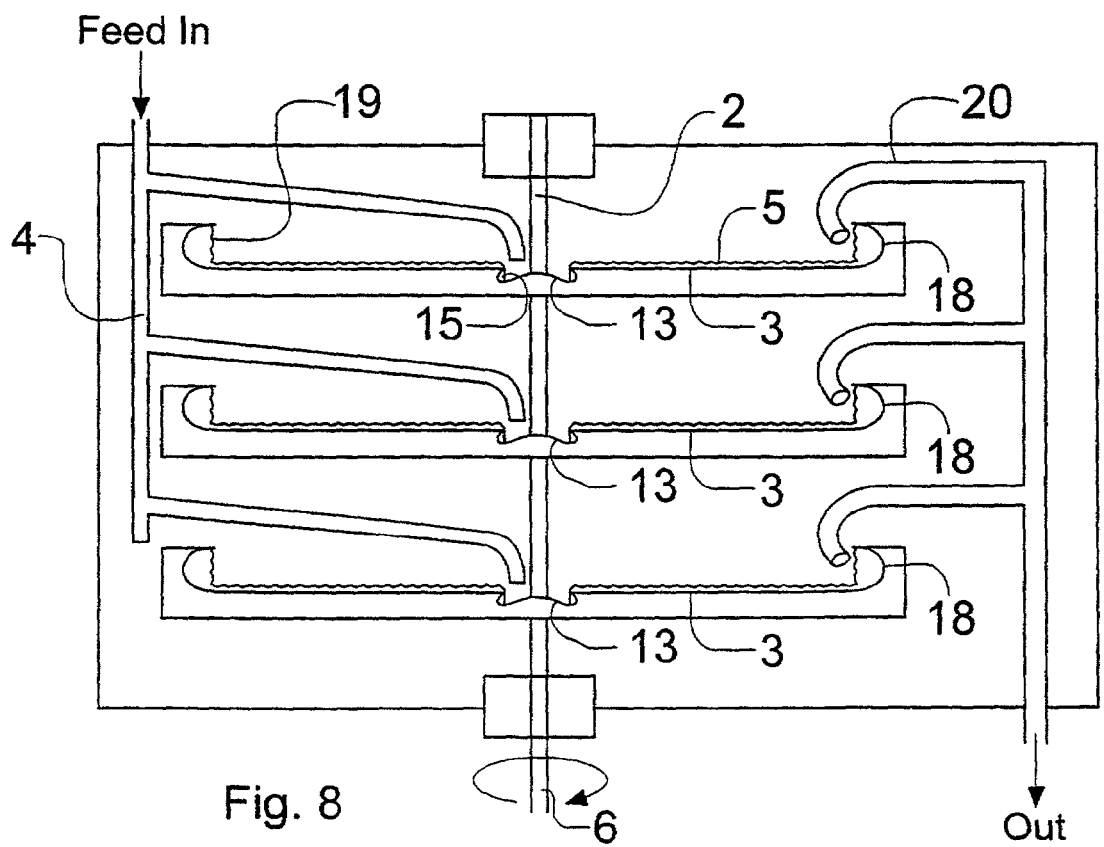
FIG. 8 shows a number of spinning discs in schematic form and operatively arranged in parallel.
Figure 9:
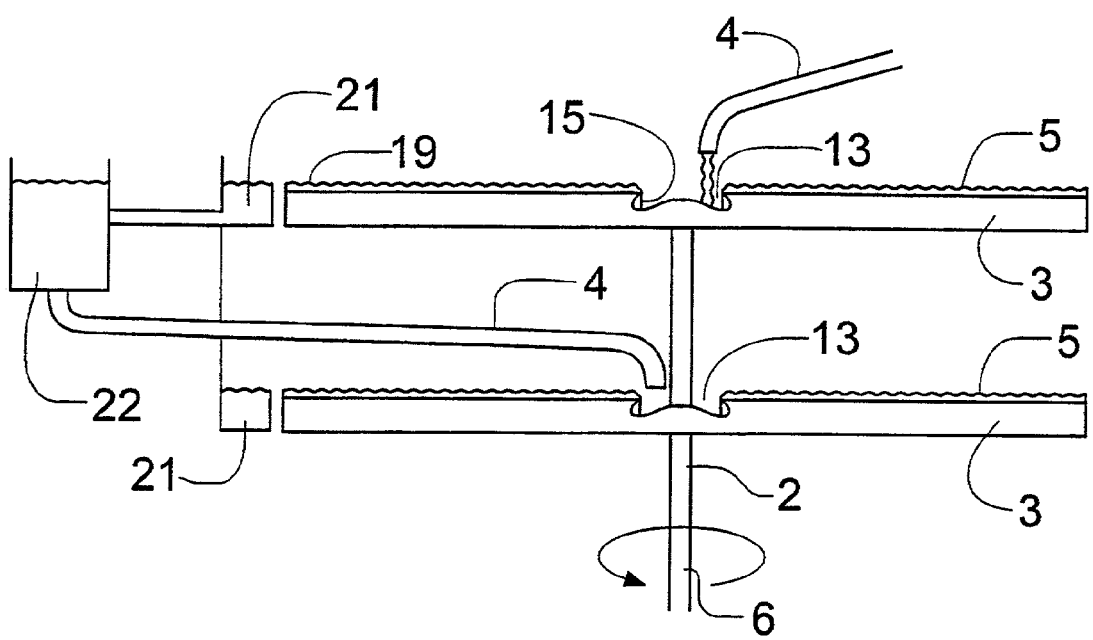
FIG. 9 shows two coaxial spinning discs in schematic form and provided with a pump unit for transferring product from one disc as feed to the second disc.

FIG. 8 shows three discs (3) coaxially mounted on a drive shaft (2) which defines an axis of rotation (6). Each disc (3) has a central trough (13) into which reactant (15) may be fed, and a peripheral wall (18). Reactant (15) is supplied in parallel to the trough (13) of each disc (3) by way of feed means (4), and then spreads out over the surfaces (5) of the discs (3). Product (19) is collected from the vicinity of the peripheral walls (18) by way of pitot tube collectors (20), which are also connected in parallel. In this way, a process can be performed across a number of discs (3) in parallel FIG. 9 shows two discs (3) coaxially mounted on a drive shaft (2) which defines an axis of rotation (6). Each disc (3) has a central trough (13) into which reactant (15) may be fed by feed means (4) before spilling onto the surface (5) of each disc (3). A collector trough (21) is provided about the periphery of each disc (3) so as to collect product (19) thrown from the discs (3). An outlet from the upper collector trough (21) passes through a pump or extruder (22) before leading to the trough (13) of the lower disc (3) as feed means (4). This arrangement is suitable for use with viscous reactants and products.

EXAMPLE 4

Spinning Disc Reactor for Polyesterification

Two investigations are important in this example: (1) to investigate the effect of increased residence time and (2) to explore the effect of higher prepolymer delivery flowrate onto the rotating disc on the change in acid number of the prepolymer feed. Results gathered for a disc with a smooth surface (Phase 1) formed the basis of the current investigations. Some rig modifications were necessary to accommodate the proposed tests. Firstly, 3 sheets of stainless steel mesh have been fixed onto the surface of the existing smooth brass disc as discussed. The new mesh disc system is expected to allow higher residence time to be attained with respect to a plain disc surface (Phase 1) under given operating conditions. Also, a pressurised feed system has been set up to deliver hot prepolymer onto the rotating disc at flowrates much higher than those achieved with feeding under gravity (Phase 1).

The results presented here relate to the experimentation carried out to test the effect of elevated residence times using the mesh disc system with prepolymer fed to the spinning disc reactor (SDR) at a flow rate of about 5 cc/s. Results using higher flow rates (14 cc/s) have also been presented and discussed.

Experimental Facility & Procedures

Figure 10:
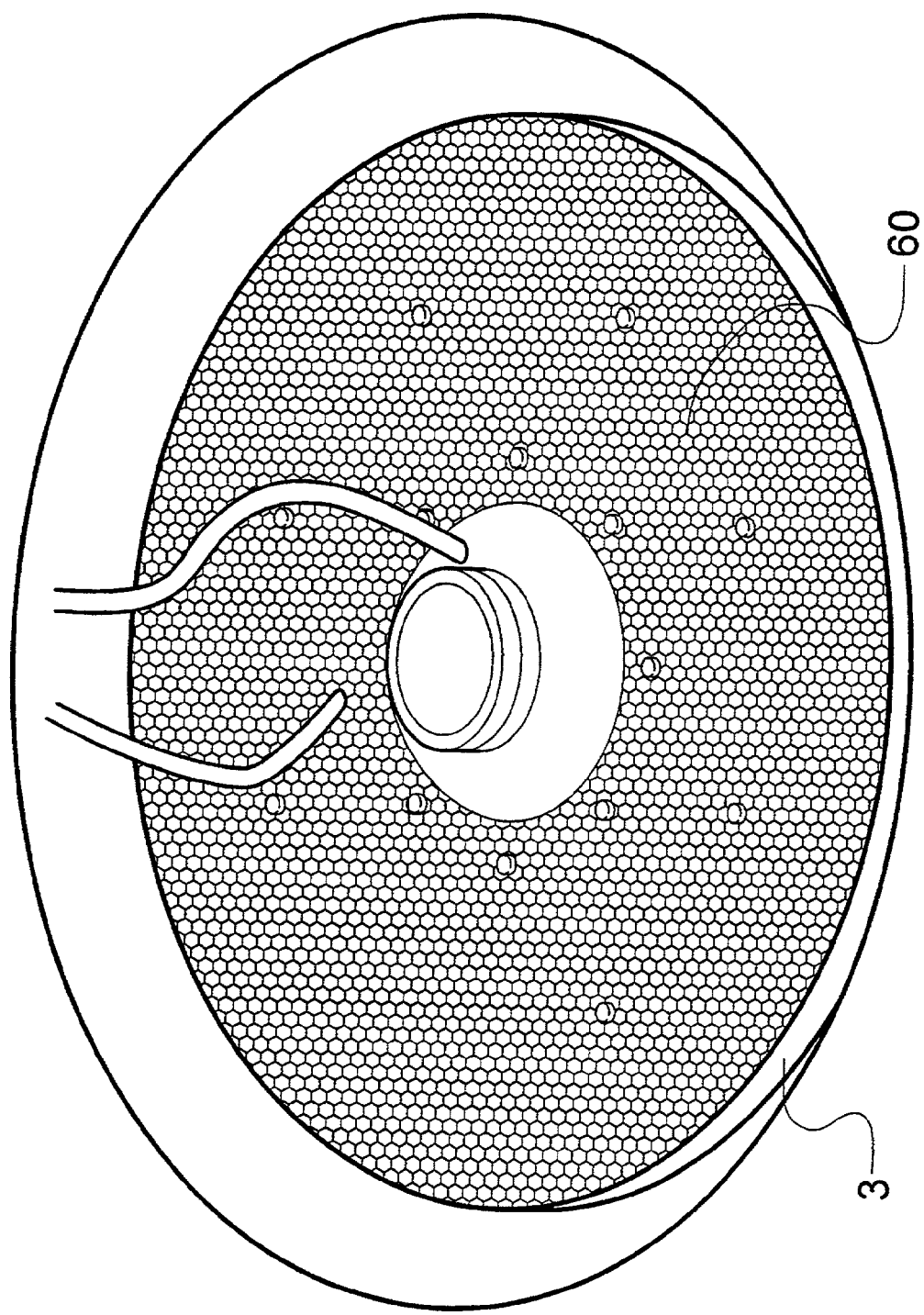
FIG. 10 shows a spinning disc reactor with a metal mesh on its surface.

The SDR experimental set-up with a high pressure feed vessel was provided with a spinning disc (3) having attached thereto a stainless steel mesh (60) packing arrangement as shown in FIG. 10.

Part 1: Runs on mesh disc at SDR flowrate of 5 cc/s

Six spinning disc runs (Runs 1–6) were performed at rotational speeds of 100, 250, 500 and 750 rpm, including repeat runs for speeds of 100 rpm and 500 rpm. A typical run consisted of 2 stages: (1) melting of the prepolymer crystals and heating to about 250° C. in a glass reactor continuously purged with a low flowrate of nitrogen and (2) feeding the melted prepolymer onto the rotating mesh disc system set at 250° C. and desired rotational speed. The chamber enclosing the spinning disc unit was purged with heated nitrogen throughout the run. Heated nitrogen was also delivered close to the centre of the disc from two small pipes whose ends were located at a small distance from the its surface. The co-current flow of nitrogen with respect to the film of polymer on the disc is an attempt to enhance the mass transfer capabilities at the gas-liquid film interface so that more water vapour is removed from the polymerising system. A flow of nitrogen was used as we have found that a flow of nitrogen is better than a non-agitated inert atmosphere. It has also been demonstrated that polymerisation under a nitrogen purge and under vacuum has no effect on the rate of polymerisation (T M Pell, Jr, and T G Davis, Polymer Physics, II (9) 1973, Pg. 16711681).

Part 2: Runs on mesh disc at SDR flowrate of 14 cc/s

Two disc runs (Runs 7 and 8) were performed using the pressurised vessel to deliver high prepolymer flowrates onto the rotating disc. The procedure for pressurising the vessel was as follows:

1. About 400 g of prepolymer crystals was charged to the feed vessel.
2. The crystals were then purged at room temperature with nitrogen at a modest flowrate for a few minutes.
3. The vessel was then filled with nitrogen at about 4 to 4.2 bar pressure at room temperature.
4. The prepolymer in the vessel was then heated by means of heating bands wound around the outside surface of the vessel to a temperature of about 250° C. recorded by a thermocouple dipped into the melt. Using the ideal gas law, it is estimated that the melt was subjected to a pressure of about 7.2 bar at 250° C.
5. The prepolymer melt was then fed onto the mesh disc by opening the valve to the feed tube, the end of which was positioned close to the centre of the disc.

The disc rotational speeds tested at the high prepolymer flowrates (measured to be about 14 cc/s) were 500 and 750 rpm. The disc temperature was set at 250° C. as before. The SDR system was also maintained under a nitrogen atmosphere as described in Part 1 above.

Results & Discussion

It is necessary to relate the results to be presented below to the residence times achieved on the mesh disc configuration. The mean residence time on a smooth rotating disc surface, $T_{res(smooth)}$, is known to be:

$$T_{res(smooth)} = \left(\frac{81\pi^2\eta}{16\rho\omega^2Q^2}\right)^{1/3}(r_o^{4/3} - r_i^{4/3})$$

where: $\eta$ = dynamic viscosity (Pa·s)

$\rho$ = density (kg/m$^3$)

$\omega$ = angular velocity (s$^{-1}$)

$Q$ = volumetric flowrate (m$^3$/s)

$r_i$ = inlet radius (m)

$r_o$ = outlet radius (m)

It has also been shown that residence time for a rotating surface having a mesh configuration, $T_{res(mesh)}$, is given by:

$$T_{res(mesh)} = T_{res(smooth)}(Za)^{2/3}$$

where:
Z=axial depth of packing (m)
a—surface area density of packing (m$^2$/m$^3$)

For the configuration used in this investigation, Z=0.003 m and a=1000 m$^2$/m$^3$.

Residence times on the rotating disc covered with the mesh packing have been calculated for the speeds tested based on estimations of prepolymer feed and SDR product viscosities at 250° C. Details of the calculations of estimated viscosities are given in Appendix A.

Estimated residence times corresponding to each run using the mesh disc are given in Table 1 below.

Part 1: Runs on Mesh Disc with Feed Flow of 5 CC/s

The experimental data obtained in the first part of the experimentation (Runs 1–6) using the mesh disc system with feeding under gravity (which corresponds to about 5 cc/s prepolymer flowrate onto the disc) are presented in Table 2 below. Graphical illustrations of the data are also displayed in FIGS. 11, 12 and 13.

TABLE 2

Effect of disc speed on acid number changes in SDR for prepolymer feed flow of 5 cc/s

| Run no. | Disc speed (rpm) | Prepolymer AN | SDR product AN | Change in AN in 1 disc pass |
|---|---|---|---|---|
| 1 | 250 | 43.77 | 41.52 | 2.25 |
| 2 | 100 | 44.73 | 42.86 | 1.87 |
| 3 | 500 | 44.36 | 42.76 | 1.59 |
| 4 | 750 | 44.27 | 43.33 | 0.95 |
| 5 | 500 | 45.03 | 42.92 | 2.11 |
| 6 | 100 | 44.88 | 43.09 | 1.79 |

Note

The accuracy in measuring the mass of the sample for analysis (about 1.5 g) was ±0.001 g and the accuracy for the titre solution of 0.1M KOH (about 12 ml) was ±0.5 ml. Therefore the overall accuracy for calculating the AN was:

$$\text{Accuracy} = \pm\left[\frac{0.001*100}{1.5} + \frac{0.5*100}{12}\right]\%$$

$$= \pm 4.2\%$$

This accuracy corresponds, in real terms, to an accuracy of about ±0.2 in AN.

From Table 2 above, it would therefore appear that, in the worst case scenario, the best result would be a decrease of about 2 in AN for a disc speed of 250 rpm.

Figure 11:
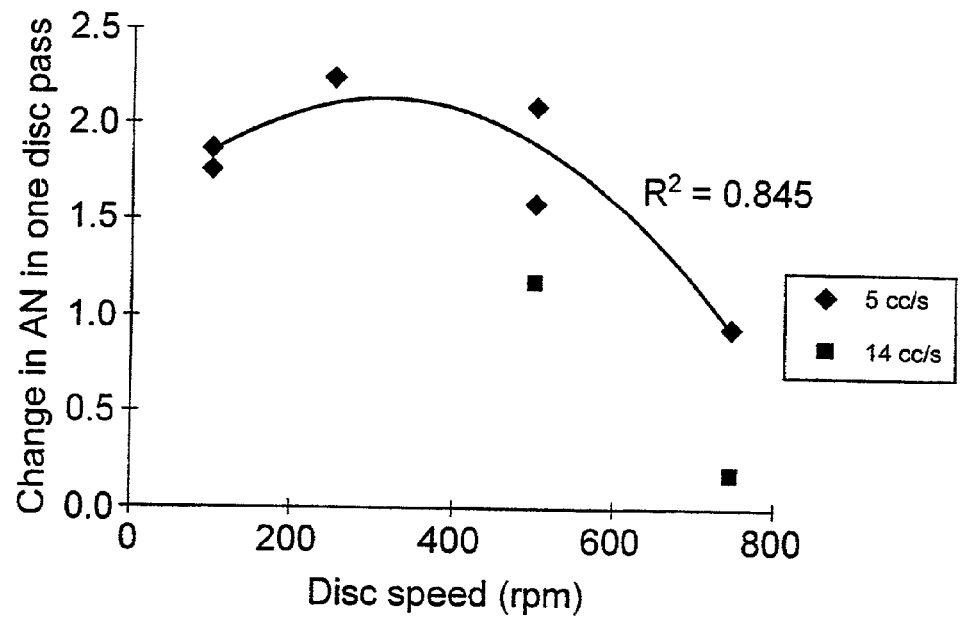
FIG. 11 is a graph of change in acid number (AN) in one pass of a disc against disc speed.
Figure 12:
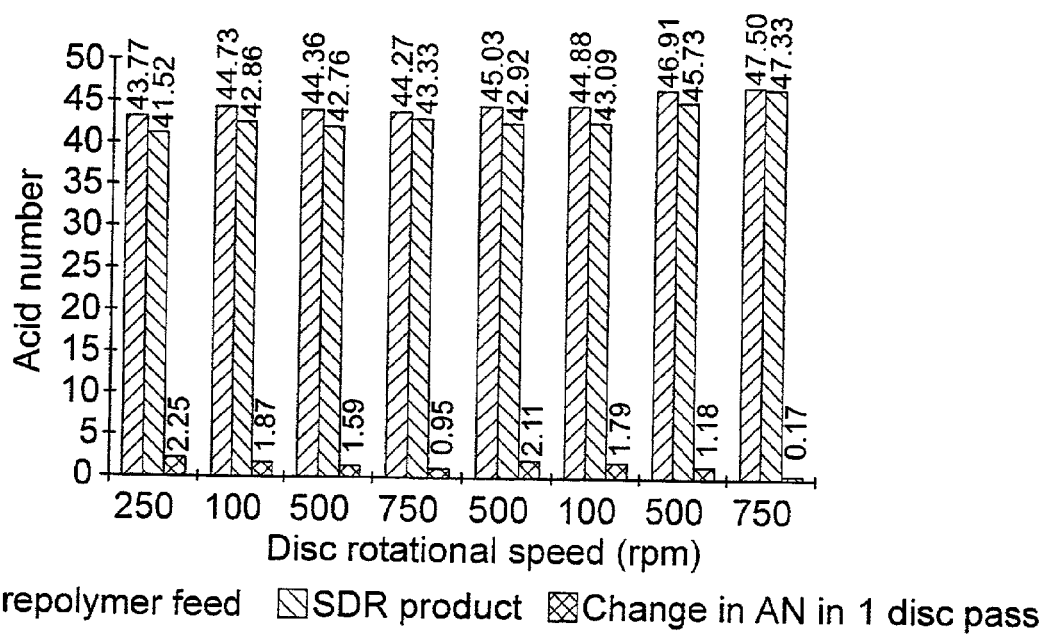
FIG. 12 is a histogram of total acid number changes against disc speed.
Figure 13:
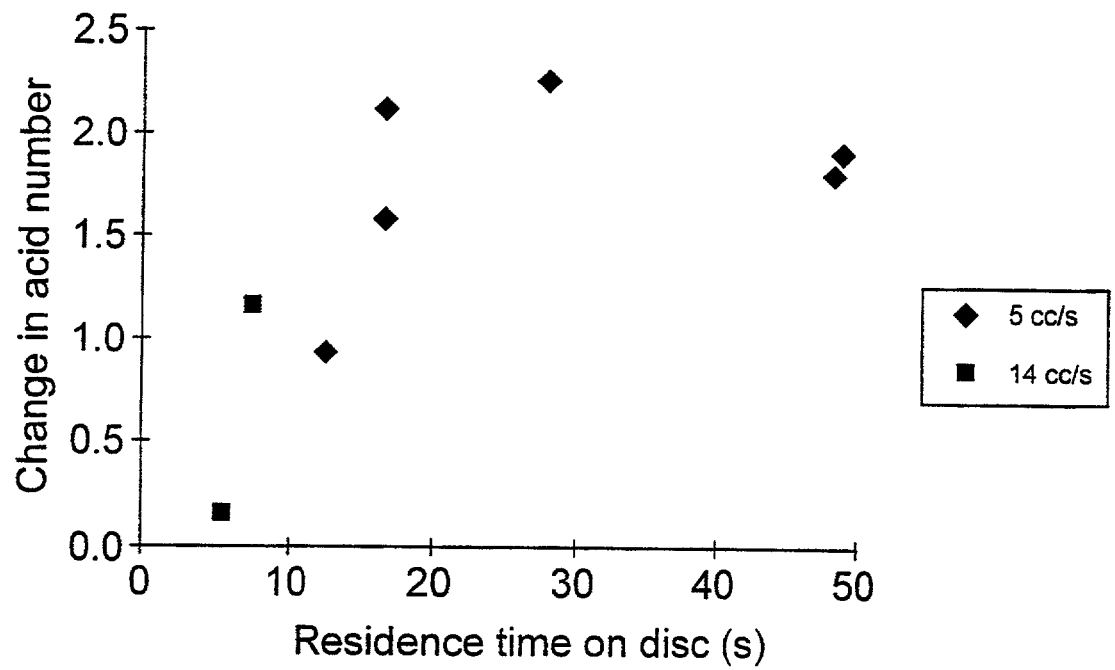
FIG. 13 is a graph of change in acid number against disc residence time.

The results shown in FIGS. 11 and 12 seem to indicate that a disc rotational speed of about 200 rpm would give the largest decrease in AN in one disc pass for an approximate feed flowrate of 5 cc/s. This corresponds to a residence time of about 28 seconds as shown in FIG. 13.

However the evaluation of optimal disc speed in this way does not take into account the various parameters besides the

TABLE 1

Residence times corresponding to Runs 1–8

| Disc Run no. | Viscosity of prepolymer at 250° C. (calculated) (Pa·s) | Viscosity of SDR product at 250° C. (calculated) (Pa·s) | Average viscosity on disc (Pa·s) | Disc speed (rpm) | Flowrate on disc, Q (cc/s) | Residence time on smooth disc $t_{res(smooth)}$ (seconds) | Residence time on mesh disc $t_{res(mesh)}$ (seconds) |
|---|---|---|---|---|---|---|---|
| 1 | 1.198 | 1.641 | 1.420 | 250 | 5 | 13.4 | 27.8 |
| 2 | 1.054 | 1.359 | 1.207 | 100 | 5 | 23.3 | 48.5 |
| 3 | 1.108 | 1.377 | 1.242 | 500 | 5 | 8.1 | 16.7 |
| 4 | 1.120 | 1.274 | 1.197 | 750 | 5 | 6.1 | 12.6 |
| 5 | 1.013 | 1.366 | 1.190 | 500 | 5 | 7.9 | 16.5 |
| 6 | 1.033 | 1.316 | 1.174 | 100 | 5 | 23.1 | 48.1 |
| 7 | 0.794 | 0.924 | 0.859 | 500 | 14 | 3.6 | 7.5 |
| 8 | 0.737 | 0.753 | 0.745 | 750 | 14 | 2.6 | 5.4 |

Note

The residence time calculations shown in Table 1 above are based on the empirical correlation derived for viscosity and AN. The procedure has been explained more thoroughly in Appendix A.

disc speed such as viscosity and flowrate which also affect the performance of the SDR. It is therefore considered more accurate to look at the change in AN in unit residence time on the disc as has been done in FIG. 14.

Figure 14:
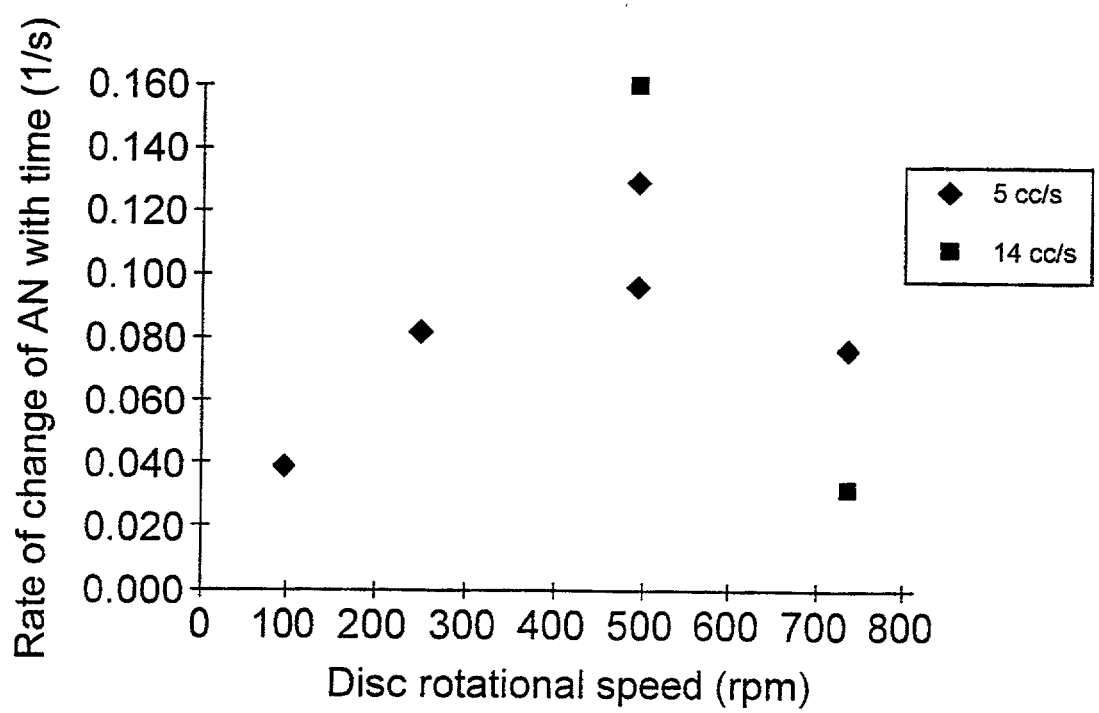
FIG. 14 is a graph of rate of change of acid number against disc speed.

From FIG. 14, it appears that the disc speed giving the maximum rate of change in AN lies in the region of 500 rpm. The decrease in the rate of change in AN beyond 500 rpm may be due to either a drop in the mass transfer performance or kinetic limitations faced by the reaction system at much reduced residence times or a combination of both. Previous mass transfer studies at Newcastle (Moore, R S, Mass transfer to thin liquid films on rotating surfaces with and without chemical reaction, Ph.D. Thesis, University of Newcastle Upon Tyne (1986)) have indicated that for a given flowrate on a rotating disc there exists a critical rotational speed beyond which the mass transfer performance decreases as shown in FIG. 14.

Part 2: Runs on Mesh Disc with Feed Flow of 14 cc/s

The results for acid number analysis for runs at high prepolymer flow of about 14 cc/s (Runs 7 and 8) are shown in Table 3 below.

TABLE 3

Effect of disc speed on acid number changes in SDR for prepolymer feed flow of 14 cc/s

| Run no. | Disc speed (rpm) | Prepolymer AN | SDR product AN | Change in AN in 1 disc pass |
| --- | --- | --- | --- | --- |
| 7 | 500 | 46.91 | 45.73 | 1.18 |
| 8 | 750 | 47.50 | 47.33 | 0.17 |

Note

The prepolymer AN could not be determined for each of the runs 7 and 8 as access to the feed from the pressurised system before it flowed into the SDR was not possible. A separate test run was done instead where the feed was delivered into a collecting bucket. Samples were taken from the bucket to analyse the AN. This was taken as the representative value for prepolymer AN for Run 7.

In the case of Run 8, however, the SDR product AN were mostly in the range 47.2 to 47.8 which leads us to believe that the prepolymer AN was slightly higher than that measured from the test run. For this reason, an assumed value of 47.5 (which could well be highly underestimated) was used as the prepolymer AN.

The data have also been plotted in FIGS. 11 to 14 on the same scale as the data for flow of 5 cc/s to enable direct comparisons to be made between the two sets of data.

From FIGS. 11 and 12, it is seen that the change in AN in the SDR at the high flowrate is less than that obtained for the low flowrate for the same speed of rotation. This would suggest that the shorter residence time at the high flowrate has a considerable impact on the performance of the SDR.

FIG. 13 also reflects the importance of residence time at both the high and low flows with the lowest residence time (about 5 s) achieved for the 14 cc/s flow at 750 rpm giving the apparently smallest change in AN. It is to be noted, though, that this result for 14 cc/s at 750 rpm is only a rough estimate for the reasons given earlier. From FIG. 13, it also emerges that the change in AN obtained for the 5 cc/s flowrate run at 750 rpm is similar to that obtained for the 14 cc/s flow at a lower speed of 500 rpm for an apparently shorter residence time. This is indicative of the effects of improved liquid—liquid mass transfer on the mesh disc at the higher flowrate of 14 cc/S.

Considering the rate of change of AN in unit residence time as shown in FIG. 14, the performance of the SDR is far better at the higher flowrate for the same speed of 500 rpm. Based on this result, it can therefore be deduced that although the higher flowrate reduces the residence time, the change in AN in the shorter exposure time is still quite significant due possibly to improvements in mass transfer rates in the packing system.

CONCLUSIONS

The conclusions are based on the assumption that the reaction on the spinning disc reactor is kinetically limited.

We have demonstrated that a 360 mm diameter meshed SDR can achieve a drop of approximately 2 points in the acid number (corresponding to a residence time of approximately 20 seconds) when the acid number of the prepolymer is around 44. This implies that if similar hydrodynamic conditions can be sustained on the SDR then to achieve a drop of 1 point in the acid number proximately 10 seconds of residence time will be required. Therefore if a drop of 10 points in the acid number is desired then 100 seconds will be required.

For a flow rate of 14 cc/s (65 kg/hr), disc rotating at 500 rpm a residence time of 100 seconds would require a 1.7 m diameter disc in order to achieve a drop of 10 points in the acid number. Alternatively if three meshed discs are used then each disc will be approximately 0.604 m in diameter. All calculations are shown in the spread sheet in Appendix B.

Figure 15:
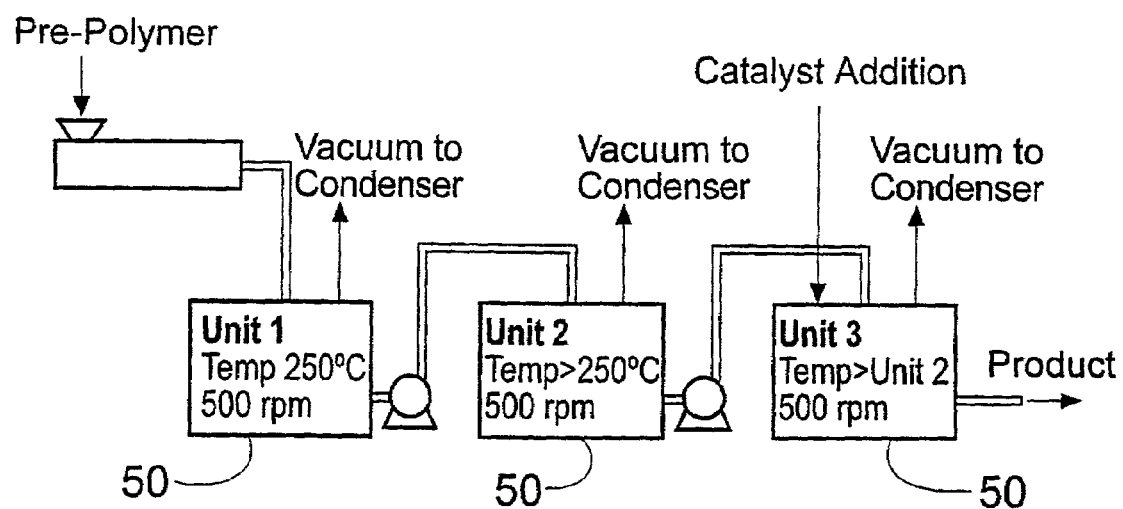
FIG. 15 shows in schematic form three spinning disc reactors connected in series.

In the absence of the test data based on the catalysed pre-polymer to achieve faster kinetics, we propose the following:

Assuming that the starting pre-polymer has an acid number of 45 and the required throughput is 360 kg/hr (based on the density of water), we suggest that three spinning disc reactors (50) each with a disc diameter of 0.97 m be used in series as shown in FIG. 15.

Each of the reactors (50) shown in FIG. 15 may be operated under different vacuum pressures. As the removal of water gets difficult when the acid number drops, we expect the vacuum pressure to increase going from unit 1 to unit 3.

Also the temperature could be different for the three different units. The temperature may be steadily increased from 250° C. in unit 1 to about 350° C. in unit 3.

The rotational speed of the three different units could also be adjusted in order to achieve the desired residence time and mass transfer characteristic.

We believe that the suggested arrangement of the SDRs in series will allow greater flexibility in terms of operating parameters and control of the process. It will also allow the use of advanced catalyst in the later stages of the process, when the water content is small. It will also keep the design of the SDRs simple and easy for instrumentation.

Figure 16:
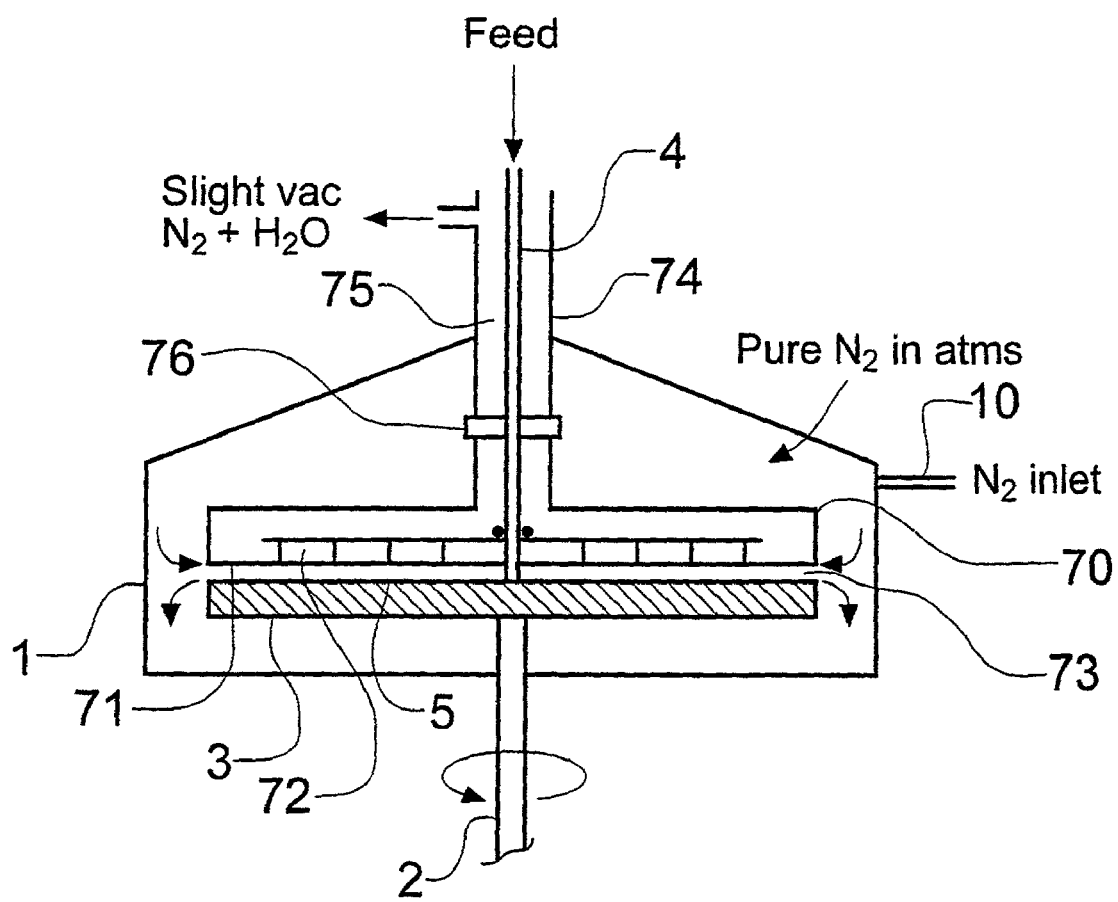
FIG. 16 shows a spinning disc provided with a rotary impeller.
Figure 17:
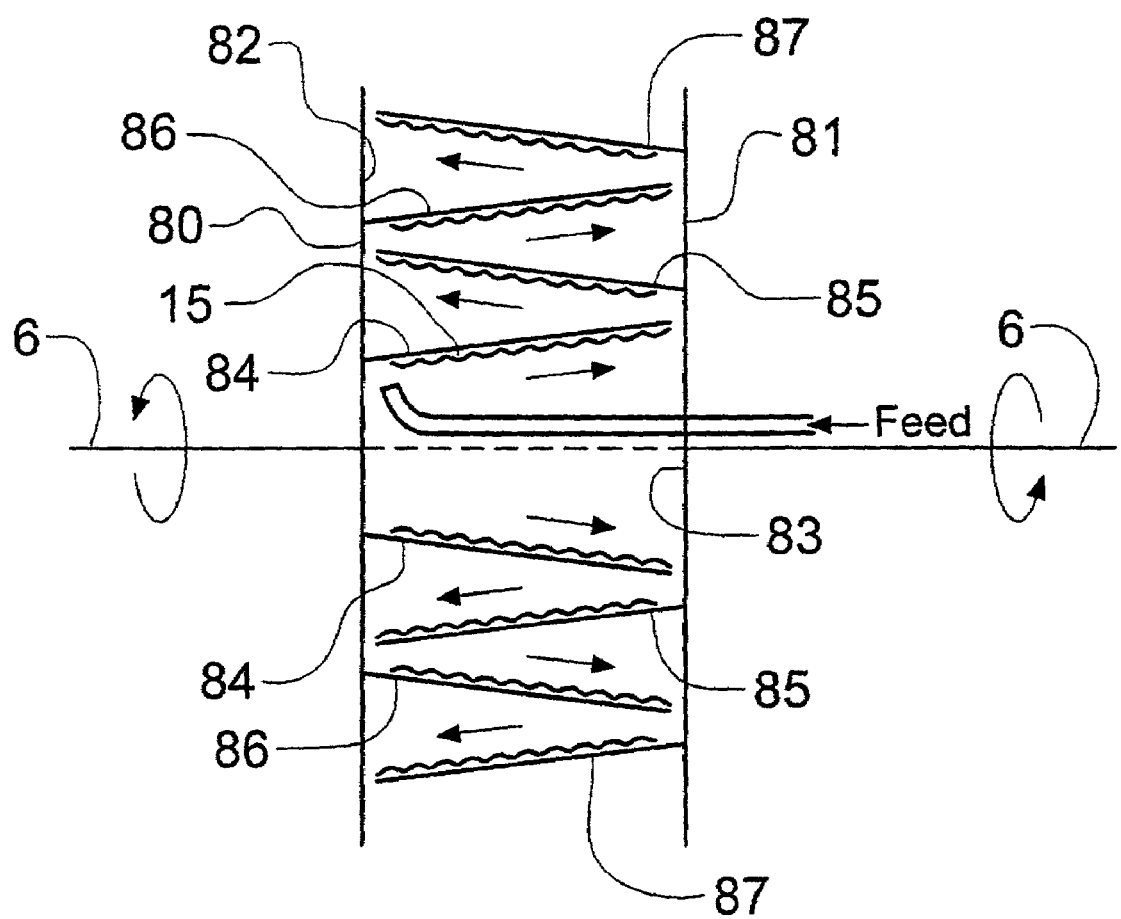
FIG. 17 shows two rotating support elements with intermeshing concentric circular walls.

FIG. 16 shows a spinning disc (3) with a surface (5) mounted on a drive shaft (2) inside a vessel (1) and provided with a feed (4) for a liquid phase reactant, such as an organic prepolymer. A rotary impeller (70) is mounted coaxially with the disc (3) and close to the surface (5), and a surface (71) of the impeller (70) facing the surface (5) is provided with vanes (72). A gaseous phase reactant, such as nitrogen, is supplied to the vessel (1) through an inlet (10). Upon rotation of the disc (3), the liquid phase reactant moves from the centre of the surface (5) towards the periphery thereof as described above. When the impeller (70) is appropriately rotated on a drive shaft (74), the gaseous phase reactant is sucked into the space (73) between the impeller (70) and the surface (5) and moves towards the centre of the surface (5) against the flow of liquid phase reactant, thereby improving mass and/or heat transfer characteristics. Gaseous phase reactant and unwanted reaction by-products may be removed from the central region of the space (73) by way of a discharge pipe (75) to which at least a partial vacuum may be applied. A partial seal (76) in the discharge pipe (75) may be provided so as to control the rate of gaseous phase reactant and by-product removal, FIG. 17 shows a pair of planar rotating support elements (80, 81) coaxially mounted on an axis of rotation (6). The facing surfaces (82, 83) of the support elements (80, 81) are each provided with a plurality of concentric circular walls (84, 85, 86, 87), with walls (84, 86) mounted on surface (82) and walls (85, 87) mounted on surface (83). The walls (84, 85, 86, 87) are divergent with respect to the axis of rotation of their respective support element (80, 81) and are positioned so that they mesh with each other when the support elements (80, 81) are brought together as shown. Reactant (15) is supplied to an interior region of wall (84) near surface (82) by a feed (4), and then proceeds to travel along an interior surface of wall (84) towards surface (83). When the reactant (15) reaches the top of wall (84), it spills over onto an interior surface of wall (85) on support element (81) and travels back towards support element (80) as shown. This process is repeated until the reactant (15) is thrown from the top of the outermost wall (87) into collecting means (not shown). By providing a convoluted surface along which the reactant (15) may travel, a very compact reactor may be obtained. The support elements (80, 81) may co- or counter-rotate Further advantages of the invention are apparent from the foregoing.

Appendix A

Viscosity Calculations

Measured viscosity data are given in Table A1 below.

TABLE A1

| Viscosity data | |
|---|---|
| AV | η |
| 34 | 104 |
| 34.9 | 96 |
| 36.3 | 82 |
| 36.4 | 82 |
| 37.6 | 73 |
| 38.3 | 74 |
| 44.5 | 22.5 |
| 41.4 | 33.5 |

Using the trendline function in Excel, an empirical correlation linking AN and viscosity @ 160° C. was derived from the given viscosity data to be (Graph A1):

$$\eta(160°\ C.) = 2 \times 10^{11}\ AN^{-5.944}\ (R^2 = 0.9504)$$

The correlation was found to fit the measured data exceptionally well given the high R-squared value of 0.9504.

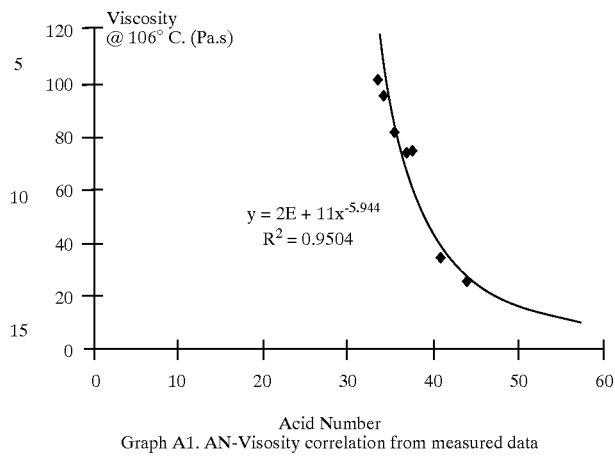

Graph A1. AN-Visosity correlation from measured data

A viscosity-temperature dependence of the form $\ln \eta = a/T + b$ was used to obtain the required viscosity at 250° C. An assumed value of a of 8500 was used. The value of b was then calculated for each known prepolymer AN and SDR product AN from the previously calculated viscosity at 160° C. (based on AN-viscosity correlation above). The viscosities estimated according to the above method are shown for each prepolymer feed and SDR products in Table A2 and A3 respectively below.

TABLE A2

Estimated viscosities at 250° C. for different prepolymer feeds

| Disc Run no. | AN of pre-polymer | Viscosity of pre-polymer at 160° C. (from AN-viscosity correlation) (Pa.s) | Corresponding value of 'b' for constant 'a' in ln(visc) = (a/T) + b | Viscosity of prepolymer at 250° C. (calculated) (Pa.s) |
|---|---|---|---|---|
| 1 | 43.77 | 35.13 | −16.07 | 1.198 |
| 2 | 44.73 | 30.91 | −16.20 | 1.054 |
| 3 | 44.36 | 32.47 | −16.15 | 1.108 |
| 4 | 44.27 | 32.84 | −16.14 | 1.120 |
| 5 | 45.03 | 29.70 | −16.24 | 1.013 |
| 6 | 44.88 | 30.28 | −16.22 | 1.033 |
| 7 | 46.91 | 23.28 | −16.48 | 0.79 |
| 8 | 47.50 | 21.62 | −16.56 | 0.74 |

TABLE A3

Estimated viscosities at 250° C. for different SDR products

| Disc Run no. | AN of SDR product | Viscosity of SDR product at 160° C. (from AN-viscosity correlation) (Pa.s) | Corresponding value of 'b' for constant 'a' in ln(visc) = (a/T) + b | Viscosity of SDR product at 250° C. (calculated) (Pa.s) |
|---|---|---|---|---|
| 1 | 41.52 | 48.10 | −15.76 | 1.641 |
| 2 | 42.86 | 39.85 | −15.95 | 1.359 |
| 3 | 42.76 | 40.36 | −15.93 | 1.377 |
| 4 | 43.33 | 37.34 | −16.01 | 1.274 |
| 5 | 42.92 | 39.51 | −15.94 | 1.366 |
| 6 | 43.09 | 38.57 | −15.98 | 1.316 |
| 7 | 45.73 | 27.09 | −16.33 | 0.92 |
| 8 | 47.33 | 22.07 | −16.54 | 0.75 |

Appendix B

| Calculation Spreadsheet for SDR Size for Pilot-Plant Scale | |
|---|---|
| SDR flowrate = | 14 cc/s |
| Axial depth, z, of mesh used = | 0.003 m |
| Surface area density of mesh, a = | 1000 m2/m3 |
| Disc rotational speed (assumed) = | 500 rpm |
| Design residence time = | 100 s |
| Number of discs to be used = | 1 (variable parameter) |
| Residence time on each disc = | 100 s |
| Average viscosity of polymer = | 1.94 Pas |
| Density of polymer = | 1000.00 kg/m3 |
| Radius of inlet of feed on disc = | 0.05 m |
| Required diameter of disc = | 1.73885992 m |
| SDR flowrate = | 14 cc/s |
| Axial depth, z, of mesh used = | 0.003 m |
| Surface area density of mesh, a = | 1000 m2/m3 |
| Disc rotational speed (assumed) = | 500 rpm |
| Design residence time = | 100 s |
| Number of discs to be used = | 3 (variable parameter) |
| Residence time on each disc = | 33.3333333 s |
| Average viscosity of polymer = | 1.94 Pas |
| Density of polymer = | 1000.00 kg/m3 |
| Radius of inlet of feed on disc = | 0.05 m |
| Required diameter of disc = | 0.60418018 m |
| SDR flowrate = | 100 cc/s |
| Axial depth, z, of mesh used = | 0.01 m |
| Surface area density of mesh, a = | 1000 m2/m3 |
| Disc rotational speed (assumed) = | 500 rpm |
| Design residence time = | 100 s |
| Number of discs to be used = | 1 (variable parameter) |
| Residence time on each disc = | 100 s |
| Average viscosity of polymer = | 1.94 Pas |
| Density of polymer = | 1000.00 kg/m3 |
| Radius of inlet of feed on disc = | 0.05 m |
| Required diameter of disc = | 2.86579965 m |
| SDR flowrate = | 100 cc/s |
| Axial depth, z, of mesh used = | 0.01 m |
| Surface area density of mesh, a = | 1000 m2/m3 |
| Disc rotational speed (assumed) = | 500 rpm |
| Design residence time = | 100 s |
| Number of discs to be used = | 3 (variable parameter) |
| Residence time on each disc = | 33.3333333 S |
| Average viscosity of polymer = | 1.94 Pas |
| Density of polymer = | 1000.00 kg/m3 |
| Radius of inlet of feed on disc = | 0.05 M |
| Required diameter of disc = | 0.97982676 M |

What is claimed is:

1. A reactor apparatus including a support element adapted to be rotatable about an axis, the support element having a surface and feed means associated therewith for supplying at least one reactant to the surface such that, upon rotation of the surface, the reactant flows freely, by way of centrifugal force generated by rotation of the surface, across the surface as a thin film and is thrown from the surface, characterised in that the surface is provided with at least one layer of a mesh which enhances its effective surface contact area in relation to the reactant and which increases a residence time of the reactant on the surface when the reactor apparatus is in use.

2. A reactor apparatus including a support element adapted to be rotatable about an axis, the support element having a surface and feed means associated therewith for supplying at least one reactant to the surface such that, upon rotation of the surface, the reactant flows freely, by way of centrifugal force generated by rotation of the surface, across the surface as a thin film and is thrown from the surface, characterised in that the surface is provided with pins or wires which enhance its effective surface contact area in relation to the reactant and which increase a residence time of the reactant on the surface when the reactor apparatus is in use.

3. A reactor apparatus including a support element adapted to be rotatable about an axis, the support element having a surface and feed means associated therewith for supplying at least one reactant to the surface such that, upon rotation of the surface, the reactant flows freely, by way of centrifugal force generated by rotation of the surface, across the surface as a thin film and is thrown from the surface, characterised in that the surface is provided with at least one layer of a reticulate foam which enhances its effective surface contact area in relation to the reactant and which increases a residence time of the reactant on the surface when the reactor apparatus is in use.

4. A reactor apparatus as claimed in claim 1, wherein the surface is provided with two or more layers of a mesh.

5. A reactor apparatus as claimed in claim 1, wherein the layer or layers of mesh are such that there is good thermal conduction between the mesh and the surface.

6. A reactor apparatus as claimed in claim 1, wherein the mesh is made of metal.

7. A reactor apparatus as claimed in claim 1, wherein the mesh has a thickness of the same order of magnitude as a thickness of a film of reactant which is formed on the surface when the reactor is in operation.

8. A reactor apparatus as claimed in claim 1, wherein the mesh is made out of or coated with a catalytic material.

9. A reactor apparatus as claimed in claim 1, wherein the surface is porous.

10. A reactor apparatus as claimed in claim 1, wherein the surface is provided with a catalytic material.

11. A reactor apparatus as claimed in claim 10, wherein a plate of catalytic material is clamped, welded or otherwise adhered to the surface.

12. A reactor apparatus as claimed in claim 1, wherein the surface is treated by ion bombardment or implantation so as to produce changes in surface wettability.

13. A reactor apparatus as claimed in claim 1, wherein the axis is substantially parallel to a direction of action of terrestrial gravity.

14. A reactor apparatus as claimed claim 1, wherein the axis is inclined with respect to a direction of action of terrestrial gravity.

15. A reactor apparatus as claimed claim 1, wherein the axis is substantially perpendicular to a direction of action of terrestrial gravity.

16. A reactor apparatus including a support element adapted to be rotatable about an axis, the support element having a surface and feed means associated therewith for supplying at least one reactant to the surface, characterised in that the surface is provided with at least one layer of a mesh which enhances its effective surface contact area in relation to the reactant and which increases a residence time of the reactant on the surface when the reactor apparatus is in use, and wherein there is further provided a rotary impeller or fan mounted close to the surface and operable to generate a gaseous flow from an outer perimeter of the surface towards a central region thereof, this flow being counter-current to a flow of reactant on the surface.

17. A reactor apparatus including a support element adapted to be rotatable about an axis, the support element having a surface and feed means associated therewith for supplying at least one reactant to the surface, characterised in that the surface is provided with pins or wires which enhance its effective surface contact area in relation to the reactant and which increase a residence time of the reactant on the surface when the reactor apparatus is in use, and wherein there is further provided a rotary impeller or fan mounted close to the surface and operable to generate a gaseous flow from an outer perimeter of the surface towards a central region thereof, this flow being counter-current to a flow of reactant on the surface.

18. A reactor apparatus including a support element adapted to be rotatable about an axis, the support element having a surface and feed means associated therewith for supplying at least one reactant to the surface, characterised in that the surface is provided with at least one layer of a reticulate foam which enhances its effective surface contact area in relation to the reactant and which increases a residence time of the reactant on the surface when the reactor apparatus is in use, and wherein there is further provided a rotary impeller or fan mounted close to the surface and operable to generate a gaseous flow from an outer perimeter of the surface towards a central region thereof, this flow being counter-current to a flow of reactant on the surface.

* * * * *